Patented Mar. 1, 1938

2,110,072

UNITED STATES PATENT OFFICE 2,110,072

MIXED SYNTHETIC GLYCERIDE VARNISH

Alfonso Miguel Alvarado, Wilmington, Del., assignor to E. I. du Pont de Nemours & Company, Wilmington, Del., a corporation of Delaware No Drawing. Application August 1, 1934, Serial No. 738,019

2 Claims. (Cl. 134—26)

This invention relates to the art of coating and more particularly to improved asphalt varnishes and products coated therewith.

Artificial leathers suitable for automobile top material have been made by applying to a flexible rubber coated fabric a top coat of asphalt blended either with oil or with polyhydric alcohol-polybasic acid resins containing chemically combined modifying agents such as drying oil and natural resin acids. I have now discovered that finishes of this kind are still further improved by blending with the asphalt a synthetic mixed glyceride which consists wholly of glyceride of monobasic acids and does not contain glycerides of polybasic acids.

I have also discovered that coating compositions produced from asphalts and synthetic mixed glycerides are improved with respect to compatibility of the asphalt and synthetic mixed glyceride, durability of the coating, and the capability of the coating to retain its high initial luster for a long period of time, if the proportion of linseed oil acid radicals is kept relatively high in relation to the other constituents of the synthetic mixed glyceride.

I have discovered further that the improvements referred to above are much more marked when rosin or other natural acidic resins, such as kauri or Congo, are incorporated into synthetic mixed glycerides containing large proportions of linseed oil acid radicals during their preparation. I have also discovered that results comparable to the introduction of the natural acidic resins may be obtained with naphthenic acids. It is to be noted, however, that when the natural acidic resins or naphthenic acid are used as above mentioned, it is not necessary for the attainment of the objects of the invention to keep the proportion of linseed oil acid radicals as high as when the natural acidic resins or naphthenic acids are absent. The rosin, Congo, naphthenic acids, etc., may be previously esterified and added to the reaction mixture in the form of the ester, such as for example rosin glyceride, commonly known as ester gum.

This invention has as an object the production of improved asphalt varnishes. A further object resides in the production of an improved artificial leather or coated fabric, which is especially adapted for use as an automobile top material. Other objects will appear hereinafter.

The synthetic mixed glycerides used in the practice of the present invention are generally made by esterifying glycerol or other polyhydric alcohol, or mixtures of polyhydric alcohols, with mixtures of fatty acids obtainable by saponification of natural oils, with mixtures of resin acids or naphthenic acids, or, as generally preferred, with mixtures of oil fatty acids with resin acids as outlined in the examples.

A variety of oil fatty acids may be used in the preparation of these synthetic mixed glycerides, for example, cottonseed, safflower, coconut, soya bean, perilla, sunflower seed, etc. Various resin acids such as rosin, Congo, kauri, Manila, and damar may also be employed. Furthermore, these synthetic mixed glycerides may be further modified by addition of monobasic acids such as oleic, stearic, benzoic, benzoyl-benzoic, etc., during the heating process. While the term "glyceride" is used throughout this specification, it should be understood that ethylene glycol, diethylene glycol, triethylene glycol, hexamethylene glycol, pentaerythritol, polyglycerols, polyglycols, and monoalky or aryl ethers of polyhydric alcohols may advantageously be substituted for all or part of the glycerol in the synthetic mixed "glycerides", in accordance with the properties required in the final composition. By the term "synthetic mixed glyceride" I mean esters of polyhydric alcohols and monocarboxylic acids which are substantially free from polycarboxylic acid radicals. It is evident, therefore, that within the purview of the term "synthetic mixed glyceride" I mean to include only synthetic mixed esters of polyhydric alcohols and monocarboxylic acids, and do not include any composition containing polycarboxylic acid radicals. These synthetic mixed glycerides are not to be confused with natural oils, mixtures of natural oils, or with oleoresinous varnishes prepared from natural oils or mixtures of natural oils as they differ from these not only in their properties, but also in their behavior in asphalt coating compositions for use in the finishing of rubber coated fabrics. Synthetic mixed glycerides differ from natural oils in the following respects:

1. Linseed-China-wood oil synthetic mixed glycerides containing relatively high proportions of China-wood oil acid radicals are free from frosting, whereas similar mixtures of linseed and China-wood oil frost.

2. The synthetic mixed glycerides referred to herein have a lesser tendency to gel upon heating than natural oils, particularly in the case of synthetic mixed glycerides containing relatively high proportions of China-wood oil acid radicals.

3. The composition of synthetic mixed glycerides may be varied at will within wide limits, whereas the composition of natural oils is relatively constant regardless of their origin.

4. The synthetic mixed glycerides referred to herein are not simple mixtures of individual glycerides of fatty acids or resin acids, but are formed by reacting a plurality of the hydroxyl groups of a polyhydric alcohol with a plurality of oil fatty acids, resin acids, or mixtures thereof. Thus, mixed esters of polyhydric alcohols with monobasic acids or mixtures of monobasic acids are formed.

5. Asphalt-synthetic mixed glyceride coating compositions retain their initial luster for a longer period of time than similar asphalt-natural oil varnishes; this advantage of asphalt-synthetic mixed glyceride varnishes over asphalt-natural oil varnishes is highly valuable in the case of automobile top material finishes, because luster retention is a prime requirement in products of this type.

The preferred procedure for making the coating compositions of this invention from asphalt and synthetic mixed glycerides is set forth in the following examples:

Example I

| | Parts by weight |
|---|---|
| Steam refined petroleum residue asphalt | 100.00 |
| Solvent naphtha | 103.07 |
| Synthetic mixed glyceride A | 40.00 |
| Turpentine | 40.00 |
| Lead-manganese resinate drier | 1.03 |
| Total | 284.10 |

The asphalt is heated to 500° F., allowed to cool to 425° F., an equal weight of solvent naphtha is added, and the mixture is stirred until the asphalt is completely dissolved. To this solution is added 80 parts by weight of a 50% turpentine solution of synthetic mixed glyceride A, and 4.1 parts by weight of a drier solution containing 1.4% lead and 0.41% manganese.

The varnish of the above example when used as a baked top-coat finish for rubber coated fabrics has a deep black color and high initial luster. This finish retains its initial luster even after prolonged exposure to the weather and sun, being definitely superior in this respect to a similar finish containing a natural oil.

Synthetic mixed glyceride A, used in the above composition, was formed from the following ingredients, using the proportions indicated:

| | Parts by weight |
|---|---|
| Glycerol | 9.18 |
| Linseed oil acids | 72.66 |
| China-wood oil acids | 18.16 |
| Total | 100.00 |

The above synthetic mixed glyceride is made by the simultaneous fusion of all of the ingredients in an open pot, provided with mechanical agitation. It has an acid number of 23.50.

Example II

| | Parts by weight |
|---|---|
| Steam refined petroleum residue asphalt | 100.00 |
| Solvent naphtha | 127.27 |
| Synthetic mixed glyceride B | 100.00 |
| Turpentine | 100.00 |
| Iron resinate | 13.71 |
| Total | 440.98 |

The asphalt is heated to 500° F., allowed to cool to 425° F., an equal weight of solvent naphtha is added, and the mixture is stirred until the asphalt is completely dissolved. To this solution is added 200 parts by weight of a 50% turpentine solution of synthetic mixed glyceride B, and 40.98 parts by weight of a solution of iron resinate containing 2.44% iron.

The varnish of the above example when used as a baked finish for rubber coated fabrics has a deep black color and high initial luster. This finish has good luster retention after prolonged exposure to the weather and is superior in this respect to a similar finish containing natural oil.

Synthetic mixed glyceride B, used in the above composition, was formed from the following ingredients, using the proportions indicated:

| | Parts by weight |
|---|---|
| Glycerol | 9.01 |
| Linseed oil acids | 68.19 |
| China-wood oil acids | 13.64 |
| Rosin | 9.16 |
| Total | 100.00 |

The above synthetic mixed glyceride was prepared in the same manner as synthetic mixed glyceride A, above, and has an acid number of 23.90.

Example III

| | Parts by weight |
|---|---|
| Blown petroleum residue asphalt | 100.00 |
| Solvent naphtha | 105.00 |
| Synthetic mixed glyceride C | 40.00 |
| Turpentine | 40.00 |
| Iron oleate | 5.00 |
| Total | 290.00 |

The asphalt is heated to 500° F., allowed to cool to 425° F., an equal weight of solvent naphtha is added, and the mixture is stirred until the asphalt is completely dissolved. To this solution is added 80 parts by weight of a 50% turpentine solution of synthetic mixed glyceride C, and 10 parts by weight of a solution of iron oleate containing 4% iron.

The above varnish when used as a baked finish for rubber coated fabrics has a deep black color and high initial luster. This finish retains its initial luster to a high degree, being superior in this respect to a similar finish containing natural oil.

Synthetic mixed glyceride C, used in the above composition, was formed from the following ingredients, using the proportions indicated:

| | Parts by weight |
|---|---|
| Glycerol | 9.09 |
| Linseed oil acids | 68.16 |
| China-wood oil acids | 18.17 |
| Rosin | 4.58 |
| Total | 100.00 |

The above synthetic mixed glyceride was made by simultaneously fusing all of the ingredients in an open pot, provided with mechanical agitation. It has an acid number of 21.90.

Example IV

| | Parts by weight |
|---|---|
| Steam refined petroleum residue asphalt | 100.00 |
| Solvent naphtha | 102.50 |
| Synthetic mixed glyceride D | 20.00 |
| Turpentine | 20.00 |
| Iron oleate | 2.50 |
| Total | 245.00 |

The asphalt is heated to 500° F., allowed to cool to 425° F., an equal weight of solvent naphtha is added, and the mixture is stirred until the asphalt is completely dissolved. To this solution is added 40 parts by weight of a 50% turpentine solution of synthetic mixed glyceride D, and 5 parts by weight of a solution of iron oleate containing 4% iron.

The varnish of the above example when used as a baked finish for rubber coated fabrics has a deep black color and high initial luster. This finish retains its luster to a remarkable degree even after prolonged exposure to the weather, being superior in this respect to a similar finish containing natural oil.

Synthetic mixed glyceride D, used in the above composition, was formed from the following ingredients, using the proportions indicated:

| | Parts by weight |
|---|---|
| Glycerol | 3.78 |
| Linseed oil acids | 10.44 |
| China-wood oil acids | 59.74 |
| Oleic acid | 26.04 |
| Total | 100.00 |

The above synthetic mixed glyceride was made by the simultaneous fusion of all of the ingredients in an open pot, provided with mechanical agitation. It has an acid number of 41.80.

Example V

| | Parts by weight |
|---|---|
| Steam refined petroleum residue asphalt | 100.00 |
| Solvent naphtha | 143.52 |
| Synthetic mixed glyceride E | 160.00 |
| Turpentine | 160.00 |
| Iron resinate | 21.88 |
| Total | 585.40 |

The asphalt is heated to 500° F., allowed to cool to 425° F., an equal weight of solvent naphtha is added, and the mixture is stirred until the asphalt is completely dissolved. To this solution is added 320 parts by weight of a 50% turpentine solution of synthetic mixed glyceride E, and 65.4 parts by weight of a solution of iron resinate containing 2.44% iron.

The varnish of the above example when used as a baked finish for rubber coated fabrics has good initial luster, and retains its luster well even after prolonged exposure to the weather, being superior in this respect to a similar finish containing natural oil.

Synthetic mixed glyceride E, used in the above composition, was formed from the following ingredients, using the proportions indicated:

| | Parts by weight |
|---|---|
| Glycerol | 8.00 |
| Linseed oil acids | 55.11 |
| China-wood oil acids | 22.97 |
| Naphthenic acid | 13.92 |
| Total | 100.00 |

The above synthetic mixed glyceride was made by simultaneously fusing all of the ingredients in an open pot, provided with mechanical agitation. It has an acid number of 24.80.

Example VI

| | Parts by weight |
|---|---|
| Steam refined petroleum residue asphalt | 100.00 |
| Solvent naphtha | 116.40 |
| Synthetic mixed glyceride F | 60.00 |
| Turpentine | 60.00 |
| Iron resinate | 8.20 |
| Total | 344.60 |

The asphalt is heated to 500° F., allowed to cool to 425° F., an equal weight of solvent naphtha is added, and the mixture is stirred until the asphalt is completely dissolved. To this solution is added 120 parts by weight of a 50% turpentine solution of synthetic mixed glyceride F, and 24.6 parts by weight of a solution of iron resinate containing 2.44% iron.

The varnish of the above example when used as a baked finish for rubber coated fabrics has good initial luster, and retains its initial luster well even after prolonged exposure to the weather, being superior in this respect to a similar finish containing natural oil.

Synthetic mixed glyceride F, used in the above composition, was formed from the following ingredients, using the proportions indicated:

| | Parts by weight |
|---|---|
| Glycerol | 8.15 |
| Linseed oil acids | 50.28 |
| China-wood oil acids | 27.42 |
| Kauri | 14.15 |
| Total | 100.00 |

The above synthetic mixed glyceride was made by simultaneously fusing all of the ingredients in an open pot, provided with mechanical agitation. It has an acid number of 28.90.

It is to be understood, however, that modifications in the method of making these synthetic mixed glycerides may be made within the scope of this invention without departing from the spirit thereof. For example, a synthetic mixed glyceride may be made by heating together a drying oil, semi-drying oil, or a non-drying oil, a monobasic resin acid, and a polyhydric alcohol in an amount greater than necessary for esterification of the resin acid until the mixture becomes homogeneous, and then reacting the product with a monobasic acid derived from a drying, semi-drying, or a non-drying oil. A mixture of drying, semi-drying, or non-drying oils, or a mixture of di- and tri-hydric alcohols may be used in the above process. Other methods for preparing the synthetic mixed glycerides described in this invention are the following:

Alternative Method A: Acid interchange is effected by reacting a drying, semi-drying, or non-drying oil with a resin acid in the presence of a catalyst such as sodium hydroxide, calcium oxide, litharge, etc. The product thus obtained is then esterified with a polyhydric alcohol or a mixture of polyhydric alcohols. An example of a synthetic mixed glyceride prepared according to this method is the following:

Synthetic mixed glyceride G

| | Parts by weight |
|---|---|
| China-wood oil | 70.50 |
| Rosin | 24.77 |
| Glycerol | 1.88 |
| Litharge | 2.85 |
| Total | 100.00 |

The synthetic mixed glyceride described above may be used in an asphalt varnish as follows:

*Example VII*

| | Parts by weight |
|---|---|
| Steam refined petroleum residue asphalt | 100.00 |
| Solvent naphtha | 106.15 |
| Synthetic mixed glyceride G | 80.00 |
| Turpentine | 80.00 |
| Lead-manganese resinate drier | 2.05 |
| Total | 368.20 |

The asphalt is heated to 500° F., allowed to cool to 425° F., an equal weight of solvent naphtha is added, and the mixture stirred until the asphalt is completely dissolved. To this solution is added 150 parts by weight of a 50% turpentine solution of synthetic mixed glyceride G, and 8.2 parts by weight of a drier solution containing 1.47% lead and 0.41% manganese.

The varnish of the above example when used as a baked finish for rubber coated fabrics has good initial luster and retains its luster well, even after prolonged exposure to the weather, being superior in this respect to a similar finish containing natural oil.

Alternative Method B: A synthetic mixed glyceride is prepared by reacting a mixture of fatty acids derived from drying, semi-drying, or non-drying oils with a resin acid, or a mixture of resin acids, and a polyhydric alcohol or mixtures of polyhydric alcohols in the presence of a high boiling solvent such as mineral spirits, said solvent constituting between 40 and 80% of the total weight of the reaction mixture. Esterification is conducted in an apparatus suitably provided with means for separating the water produced by the reaction, and for continuously returning the solvent to the reaction mixture after separation of the water. The following is an example of a synthetic mixed glyceride prepared according to this method:

*Synthetic mixed glyceride H*

| | Parts by weight |
|---|---|
| Glycerol | 4.74 |
| China-wood oil acids | 15.80 |
| Oleic acid | 20.33 |
| Rosin | 9.13 |
| Mineral spirits | 50.00 |
| Total | 100.00 |

The above synthetic mixed glyceride may be used in an asphalt varnish similarly to synthetic mixed glyceride G, above.

While no hard and fast rule can be made regarding the proportions of the constituents for the synthetic glyceride that give the most satisfactory results in all cases, it may be stated that the preferred limits of China-wood oil acid radicals (calculated as glyceride) in a linseed-China-wood oil acids synthetic mixed glycerine lie between 5 and 40%, based on the per cent. composition of the synthetic mixed glyceride. The percentage of resin acid radical (calculated as glyceride) in compositions of this sort may constitute up to 30% of the weight of the synthetic mixed glyceride. In general, the higher the percentage of China-wood oil acid radicals in linseed-China-wood oil acids synthetic mixed glycerides, the higher should be the proportion of resin acid radicals. The percentage of oleic acid radicals (calculated as glyceride) or other non-drying or semi-drying oil acids may constitute up to 50% of the weight of the synthetic mixed glyceride.

The compatibility of asphalt-synthetic mixed glyceride varnishes is determined by such factors as composition, viscosity, and acid number. If varnishes of longer gallon length than those exemplified are desired, the synthetic mixed glyceride should not be bodied to too high a viscosity, the acid number not be reduced below 30, and the proportion of linseed oil acid radicals not be less than about 60% of the total weight of the synthetic mixed glyceride. In general, the acid number of synthetic mixed glycerides containing more than 40% China-wood oil acid radicals (calculated as glyceride) should not be lower than about 35, if varnishes of longer gallon length than 20 gallons are desired. The term "gallon" or "gallon oil length", as used in the varnish trade, designates a gallon of oil per 100 pounds of gum by weight. This is generally about 8 pounds of oil to 100 pounds of gum. The term "gallon" or "gallon length" as used herein designates 8 pounds of synthetic mixed glyceride per 100 pounds of asphalt. Synthetic mixed glycerides containing high percentages of China-wood oil acid radicals are less compatible than those containing relatively high percentages of linseed oil acid radicals. However, substantial quantities of China-wood oil acid radicals are highly desirable in these compositions, since a toughening action on the resulting asphalt-synthetic mixed glyceride varnish is thereby obtained. Incorporation of relatively small quantities of resin (especially rosin) acid radicals with the oil acid radicals prevents excessive bodying of a synthetic mixed glyceride, and leads to better compatibility characteristics with asphalt. The presence of non-drying oil acid radicals, that is, oleic acid radicals, is also highly desirable since a toughening action on the resulting asphalt-synthetic mixed glyceride varnish is thereby obtained. Although China-wood oil acids and China-wood oil have been disclosed specifically in the examples, it is to be understood that the invention is applicable to the manufacture of synthetic mixed glycerides from other oils such as oiticica oil and Japanese wood oil (or from the acids derived therefrom), and the subsequent use of these synthetic mixed glycerides in asphalt varnishes. It is to be understood further that reference to China-wood oil acids in the claims is intended to designate, in general, oil acids derived from oils which exhibit the characteristic property of frosting, either alone or in oleoresinous varnishes.

The presence of metal salts of organic acids such as the iron, cobalt, lead, or manganese salts of fatty acids and resinic acids considerably improves the compatibility of asphalt-synthetic mixed glyceride compositions. The iron salts are particularly desirable because they are superior to other metal organic acid salts in their blending power for asphalt-synthetic mixed glyceride compositions.

In the absence of pigments, it is not desirable to make varnishes of longer gallon length than about 20 gallons. However, when pigments are used, preferably in amounts varying from 12 to 55%, on the total solids content of the varnish, it is possible to prepare varnishes of 40 to 50 gallons in oil length which have excellent durability on outdoor exposure. Varnishes containing no pigment and under 20 gallons oil length are preferably prepared with steam refined petroleum residue asphalt, whereas varnishes of longer gallon length than about 20 gallons are preferably made with gilsonite, and pigmented with from 12% to 55% of carbon black, based on total solids, as disclosed and claimed in co-pending application Serial No. 705,458, filed January 5, 1934 now Patent No. 2,065,881.

The durability of films yielded by the varnishes of this invention, as well as the gallon length possible, will vary somewhat for asphalts from different sources. I prefer to use a petroleum residue asphalt which has been refined by steam distillation, as distinguished from petroleum residue asphalts which have been refined by other methods, as for instance, by blowing with air. I have found that the most durable varnishes are produced from steam refined petroleum residue asphalts, and these asphalts are, therefore, preferred in the preparation of the compositions of this invention. These steam refined petroleum residue asphalts should preferably have a softening point between the approximate range of 150° F. and 250° F., as determined by the Ball and Ring method described in A. S. T. M. Standards, 1921, p. 944, under the serial designation D—36—21. It is desirable, furthermore, that the steam refined petroleum residue asphalt have as high a melting point as possible within the range given, in order to obtain with this type of asphalt a high order of durability and retention of luster on exposure to the weather. The advantages inherent in the practice of the present invention may, however, be obtained through the use of other asphalts such as gilsonite and other natural bitumens.

Other solvents such as toluol, xylol, and Hi-flash naphtha may be used instead of the turpentine and solvent naphtha mentioned in the examples.

The compositions of this invention may be dried either by baking at a sufficiently high temperature to vulcanize the rubber, or by allowing them to stand at room temperature.

The coating compositions herein disclosed are of particular utility as top coatings for fabrics which are exposed to the weather and sun. These compositions are especially valuable as coatings for automobile top material, because of their resistance to deterioration and their capability of retaining an attractive appearance after long exposure to the weather.

When applying these compositions to automobile top material, usually rubber coated fabric material, I may use a one-coat system or a two-coat system. In the one-coat system, which is the simplest embodiment of this invention, the asphalt coating composition is applied over the uncured rubber and then subjected to heating at a suitably high temperature, and for a sufficient time to vulcanize the rubber and thoroughly fuse the asphalt varnish film.

By this treatment, I obtain on the surface of the goods a smooth, continuous film which is substantially inert and which remains for a long time unaffeceted by sunlight exposure. The temperature and time of cure depends on the rubber compound, especially on the kind of accelerator used. As a rule, the temperature will lie between 240° F. and 275° F., and the time of cure will vary from 30 minutes to 3 hours. Usually the composition, when applied over rubber, is baked for 2.5 hours at 250° F. It is preferred, however, because of the greater flexibility and better retention of gloss obtained thereby, first to apply a suitable intermediate varnish coating, such as the varnishes exemplified below:

*Example VIII*

| | Parts by weight |
|---|---|
| Carbon black | 2.5 |
| Bodied China-wood oil and drier | 20.0 |
| Bodied linseed oil with drier | 20.0 |
| Gilsonite | 3.5 |
| Turpentine substitute | 54.0 |
| Total | 100.0 |

This intermediate coat may be "air-dried", if desired, that is, dried at room temperature, but it is more advantageous from the cost standpoint to "force dry" it, that is, dry it at an elevated temperature, preferably below the vulcanizing temperature of the rubber. Generally, I prefer to dry the first coat of varnish by heating it up to 250° F. to 270° F. in one hour, after which I apply the final asphalt varnish coating, and finish by baking the system at a temperature of about 250° F. for such a time as is required to complete the vulcanization of the rubber compound. Other intermediate varnishes, such as suitable asphalt varnishes, have also been used with excellent results. The characteristics desired in the asphalt varnish determine to a certain extent the nature of the asphalt to be used in its manufacture. When the varnish is to be baked at the vulcanizing temperature of the rubber, I prefer to use a steam refined petroleum residue asphalt melting between 150° F. and 200° F. In varnishes which are to be air-dried or baked at lower temperatures, at temperatures lower than that required for the vulcanization of the rubber, the harder asphalts (such as those melting between 200° F. and 250° F.) are preferred. Among other asphalts suitable for varnishes to be air-dried or baked at low temperatures may be mentioned gilsonite and other natural bitumens.

In some cases, it is advantageous, after applying the intermediate varnish coat, to bake at the vulcanizing temperature for a portion of the vulcanizing period and to complete the vulcanization of the rubber by baking at the same temperature after the final coat of asphalt varnish has been applied. This procedure somewhat shortens the total time required to complete the process, but it is important that care should be taken, on the one hand, to avoid overvulcanization of the rubber, and on the other hand, that the final coat should receive not less than about one hour's treatment at the vulcanizing temperature in order to produce the best results. However, I do not wish to limit this invention to a process which involves heating the final asphalt varnish coat of a two-coat system, since good results may be obtained with a two-coat system in which the first coat is a baked varnish and the second coat an air-dried asphalt varnish. My improved asphalt coating composition may also be used in the production of artificial leather by finishing coated materials, other than rubber coated fabrics, such as nitrocellulose coated and linseed oil coated fabrics. The coated sheet materials included in the present invention cover fabrics such as paper, or cloth coated with a layer of material such as rubber or pyroxylin by spraying, spreading, calendering, or by other methods of application known to the art.

Pigments such as carbon black and asbestine may be added to the varnishes herein disclosed, and such additions generally result in improved durability, particularly in the longer gallon length varnishes.

As many apparently widely different embodiments of this invention may be made without departing from the spirit or scope thereof, it is to be understood that I do not limit myself to the specific embodiment thereof except as defined in the appended claims.

I claim:

1. A coating composition comprising asphalt and a mixed polyhydric alcohol ester containing the acid radicals of monocarboxylic acids only which comprise in substantial amount the acid radicals derived from at least two different drying oils, said last mentioned acid radicals including from 5% to 40%, based upon the composition of the synthetic mixed glyceride, of Chinawood oil acids.

2. The coating composition set forth in claim 1 in which the acid radicals of the other of said two different drying oils are the acid radicals of linseed oil acids.

ALFONSO M. ALVARADO.